No. 718,644. PATENTED JAN. 20, 1903.
J. LEMIRE.
MILK AERATOR.
APPLICATION FILED AUG. 16, 1902.
NO MODEL.
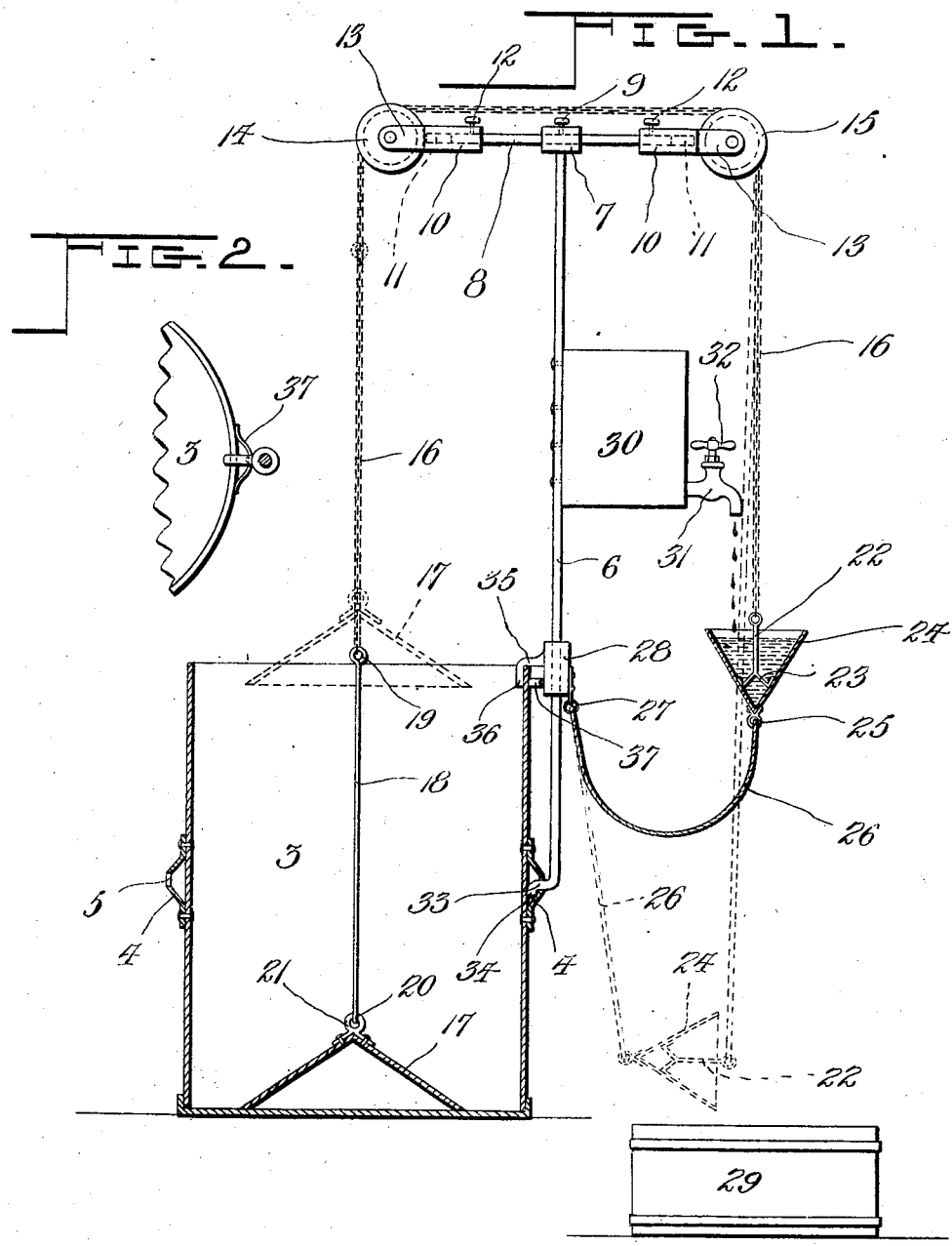
Witnesses: Joseph Lemire, Inventor,
By Marion & Marion
Attorneys

UNITED STATES PATENT OFFICE.

JOSEPH LEMIRE, OF DRUMMONDVILLE, CANADA.

MILK-AERATOR.

SPECIFICATION forming part of Letters Patent No. 718,644, dated January 20, 1903.

Application filed August 16, 1902. Serial No. 119,866. (No model.)

*To all whom it may concern:*

Be it known that I, JOSEPH LEMIRE, a subject of the King of Great Britain, residing at Drummondville, county of Drummondville, Province of Quebec, Canada, have invented certain new and useful Improvements in Milk-Aerators; and I do hereby declare that the following is a full, clear, and exact description of the invention, such as will enable others skilled in the art to which it appertains to make and use the same.

My invention relates to improvements in milk-aerators for use in dairies and the like; and the objects that I have in view are to provide means for agitating the milk, so as to prevent the cream from accumulating on the surface and also to allow the animal heat and odors to escape therefrom, to enable the appliance to be transferred readily from one milk vessel to another, to cause the milk to be periodically and regularly agitated without any supervision whatever on the part of operatives or attendants, to accomplish these aims without the necessity of providing any clockwork or motor mechanism of any kind that is liable to get out of order, and to provide a cheap, simple, and effective apparatus that can be readily attached to a milk vessel, can be operated by any one without requiring any skill, and will infallibly and accurately perform its functions without any expense or trouble in the maintenance of the same.

To these ends my invention consists, substantially, in a framework adapted to be attached to the side of a milk vessel and carrying a water-tank at an elevated point thereof, which is arranged with a suitable cock or other means for causing a regular and retarded flow of water therefrom. The water is caused to pass into a vessel which is attached to an agitator within the milk vessel, and when said vessel becomes filled with the water it overbalances the agitator and causes the same to be raised, while the vessel itself is dropped and emptied by suitable mechanism, after which said vessel being lighter than and consequently no longer counterbalancing the weight of said agitator the latter again sinks to the bottom of the milk vessel, while the water vessel rises and is again slowly filled with water.

My invention further consists in providing one or more pulleys, over which passes a chain, to one end of which the counterbalancing vessel above referred to is attached, while the other end is attached to a cone-shaped plate depending within the milk vessel and adapted to perform the functions of an agitator. This counterbalancing vessel has just sufficient capacity so that when filled with water its weight is greater than that of the agitator, and consequently in this condition the agitator will be raised. At the same time, however, a string attached to the bottom of said counterbalancing vessel causes the same to be overturned and emptied, whereby the reverse movement is caused to take place.

My invention further consists in the construction and combination of parts hereinafter more particularly described, and pointed out in the claims.

In the drawings accompanying this specification I have shown a preferred form of my improved milk-aerator, and therein—

Figure 1 is a vertical central section of a milk vessel and some of the parts of the agitator, the remaining parts of the latter being shown in elevation. Fig. 2 is a fragmentary detail plan view of the edge of the milk vessel having the improved device attached thereto to illustrate the manner of attaching the same.

The same numerals of reference denote like parts in each figure of the drawings.

3 is a milk vessel of any ordinary or desired form, being herein illustrated as of the usual cylindrical pattern with a pair of side handles 4, having central round holes 5 therein through which a bail or grapple may be inserted for raising said milk vessel by a suitable hoist. To the side of this vessel is attached a vertical post 6, which rises to a considerable height above the edge thereof and has at its upper end a cross-head 7, which is perforated by a bore at right angles to the post 6 and carries therein a cross-bar 8, extending on either side of the cross-head 7 and adjustably clamped thereto by means of a set-screw 9. At the ends of the cross-bar 8 are carried a pair of forked sleeves 10, which have sockets 11 formed therein into which the ends of the bar 8 project, which ends are clamped in said sockets by means of setscrews 12. The forked ends 13 of the sleeves 10 carry journaled therein small pulleys or sheaves 14 and 15, over which passes a suitable flexible connection, such as a chain 16. The pulley 14 on one end of the bar 8 is arranged to be located directly over the milk can or vessel 3, so as to cause the chain 16 to depend axially therein, and to this end of the chain 16 is attached a conical agitator-plate 17, preferably through the medium of the rod 18, which has an eye 19 formed on its upper end and passing through the last link of the chain 16, and a similar eye 20, interlocking with an eye-lug 21, riveted to the apex of the conical plate 17. At the other end of the chain 16 is secured a short rod 22, whose lower end is branched, as shown at 23, and firmly secured, as by rivets or soldering or in any other suitable manner, to a conical water vessel 24, which has secured to its apex an eye-lug 25. The capacity of this vessel 24 is such that when filled with water its weight is sufficient to counterbalance the agitator-plate 17 and the rod 18, and thus cause them to rise when it falls; but when the vessel 24 is empty the weight of the agitator 17 and rod 18 is greater than said vessel, whereby the latter is caused to be raised by means of the chain 16 and held in upright position, as shown in full lines in the drawings. The eye-lug 25 has passed therethrough one end of a cord 26, whose opposite end is connected to a ring 27, secured to the sliding block 28, which slides on the post 6, or it may be connected to any other suitable part of the apparatus, such as the milk vessel 3, as will be obvious. The cord 26 is of sufficient length to permit the vessel 24 to be lowered to the lowest position shown in the drawings and of such length that when lowered to a distance approximately equal to the height of the milk vessel the cord 26 by its connection 25 will cause the vessel 24 to be overturned in the manner shown by the dotted lines and emptied into any suitable receptacle 29.

Mounted on the rod 6, immediately over the vessel 24, is a water-tank 30, which has at its lower end a cock or valve 31, through which the water therein is adapted to flow, and the flow through the valve 31 is adapted to be regulated by the position of the handle 32, so that water is caused to flow slowly into the vessel 24 and to fill it at predetermined intervals.

The mode of operation of the invention as thus far described will be clear from the following considerations: The parts being in the position shown in Fig. 1, the handle 32 is adjusted so as to cause water to drop slowly into the vessel 24 and after a certain period to fill the same. At this point the weight of the vessel 24 overbalances the weight on the opposite end of the chain, as stated, whereupon the agitator 17 will be caused to rise through the milk in the vessel 3, and the vessel 24 will descend until it is overturned by the cord 26, thus emptying the vessel 24, whereupon it will immediately rise by reason of the agitator 17 overbalancing it, and the latter will accordingly descend through the milk, thus agitating it in both directions and causing the same to be aerated, as well as preventing the collection of cream on its surface. As soon as it has reached the top the vessel 24 will again begin to fill with water, and this process will continue as long as the tank 30 is kept supplied, which may be done at proper intervals by an attendant or by the automatic inflow from a water-main.

The method of readily and adjustably securing the post 6 to the vessel 3 is also of my invention, and it consists, substantially, in forming its lower end with a rectangularly-bent portion 33 and a downwardly-bent toe 34, which is adapted to be inserted through the aperture 5 in one of the handles 4, and subsequently the post 6 is turned into vertical position, when the toe 34 prevents the lower end from coming out of the handle 4. In this vertical position the post 6 is sustained by the sliding block 28, which embraces the post 6 and has a bracket-arm 35, with a downwardly-bent finger 36, arranged to hook over the side of the vessel 3, and I preferably provide the block 28 with a pair of spring-fingers 37, formed of a single plate of metal and riveted or otherwise secured to the block, which spring-fingers are adapted to press against the side of the vessel 3 and steady the post, while holding the finger 36 in contact with the inner side of the vessel.

While I have shown in the accompanying drawings the preferred form of my invention, it will be understood that I do not limit myself to the precise form shown, for many of the details may be changed in form or position without affecting the operativeness or utility of my invention, and I therefore reserve the right to make all such modifications as are included within the scope of the following claims or of mechanical equivalents to the structures set forth.

Having thus described my invention, what I claim as new, and desire to secure by Letters Patent, is—

1. A milk-aerator comprising a vertical post having one or more pulleys at the upper end thereof, a flexible connection passing over said pulleys, an agitator attached to one end of said flexible connection and adapted to depend within a milk vessel, a water vessel suspended in upright position to the opposite end of said flexible connection, means for delivering water at a specified rate into said water vessel to overbalance said agitator, and a cord attached to the bottom of said vessel and to a stationary point to cause the same to be overturned at a definite point in its descent.

2. A milk-aerator comprising an upright post, means for attaching said post to the side of the milk vessel, a cross-bar at the upper end of said post, a pair of pulley-sheaves carried at the ends of said cross-bar, a flexible connection passing over said pulleys, an agitator attached to one end of said flexible connection, a water vessel attached to the opposite end, a loose cord attached to a stationary point and to a point of said water vessel to cause the same to be overturned in its descent, and means for delivering water into said vessel to overbalance said agitator.

3. A milk-aerator comprising an upright post, means for attaching said post to the side of the milk vessel, a cross-bar at the upper end of said post, a pair of pully-sheaves carried at the ends of said cross-bar, a flexible connection passing over said pulleys, an agitator attached to one end of said flexible connection, a water vessel attached to the opposite end, a loose cord attached to a stationary point and to a point of said water vessel to cause the same to be overturned in its descent, a water-tank fixed to said post, and a regulating-valve leading from the lower portion of said tank and adapted to deliver water into said water vessel.

4. In a milk-agitator, the combination of a vertical post having a bent foot adapted to rest in a projecting handle on a milk vessel, a sliding sleeve on said post having a downwardly-bent finger adapted to hook over the edge of said milk vessel, and an agitator supported by said post.

5. In a milk-agitator, the combination of a vertical post having a bent foot adapted to rest in a projecting handle on a milk vessel, a sliding sleeve on said post having a downwardly-bent finger adapted to hook over the edge of said milk vessel, and a pair of laterally-extending spring-fingers fixed to said sliding post and extending laterally therefrom and adapted to press against the side of said vessel to steady said post.

6. A milk-aerator comprising an upright post having a rectangularly and downwardly bent foot adapted to fit into and rest upon a handle formed on a milk vessel, a sliding sleeve adapted to reciprocate loosely on said post and having a downwardly-bent finger adapted to hook over the edge of the milk vessel, means for steadying said post and holding said sliding block in position, a cross-head carried by the upper end of said post, a cross-bar carried in said cross-head, a pair of pulley-sheaves adjustably fixed to the ends of said cross-bar, a flexible connection passing over said pulleys, a conical agitator-plate adapted to rise and fall centrally within the milk vessel and fixed to the end of said flexible connection, a water vessel fixed to the opposite end of said flexible connection and adapted when filled to a certain level to overbalance said agitator, a cord attached to the bottom of said vessel and to said sliding sleeve, a water-tank fixed at an intermediate point on said post above said water vessel, and a regulating-valve adapted to deliver water from said tank into said water vessel, substantially as described.

In witness whereof I have hereunto set my hand in the presence of two witnesses.

JOSEPH LEMIRE.

Witnesses:
J. A. MARION,
T. MYNARD.